(12) United States Patent
Emoto et al.

(10) Patent No.: US 8,234,002 B2
(45) Date of Patent: Jul. 31, 2012

(54) CLOSED CONTAINER AND CONTROL SYSTEM FOR CLOSED CONTAINER

(75) Inventors: Jun Emoto, Tokyo (JP); Tomoshi Abe, Tokyo (JP)

(73) Assignee: TDK Corporation, Tokyo (JP)

( * ) Notice: Subject to any disclaimer, the term of this patent is extended or adjusted under 35 U.S.C. 154(b) by 313 days.

(21) Appl. No.: 12/389,541

(22) Filed: Feb. 20, 2009

(65) Prior Publication Data

US 2009/0211940 A1 Aug. 27, 2009

(30) Foreign Application Priority Data

Feb. 21, 2008 (JP) ................................. 2008-039623

(51) Int. Cl.
*G06F 19/00* (2006.01)
(52) U.S. Cl. ............. 700/115; 700/113; 141/1; 141/83; 141/98
(58) Field of Classification Search ............... 141/1, 83, 141/98; 700/113, 115
See application file for complete search history.

(56) References Cited

U.S. PATENT DOCUMENTS

| | | | | |
|---|---|---|---|---|
| 4,724,874 A | * | 2/1988 | Parikh et al. ................. | 141/98 |
| 5,917,433 A | * | 6/1999 | Keillor et al. ................. | 340/989 |
| 6,130,602 A | * | 10/2000 | O'Toole et al. ............. | 340/10.33 |
| 6,901,971 B2 | * | 6/2005 | Speasl et al. ................. | 141/1 |
| 7,034,683 B2 | * | 4/2006 | Ghazarian ................. | 340/568.1 |
| 7,082,344 B2 | * | 7/2006 | Ghaffari ..................... | 700/115 |
| 7,145,437 B2 | * | 12/2006 | Jalkanen et al. ............ | 340/10.3 |
| 7,156,129 B2 | * | 1/2007 | Speasl et al. ................. | 141/83 |
| 7,490,637 B2 | * | 2/2009 | Speasl et al. ................. | 141/98 |
| 2001/0050580 A1 | * | 12/2001 | O'Toole et al. ............. | 327/158 |
| 2003/0128100 A1 | * | 7/2003 | Burkhardt et al. ............. | 340/5.8 |
| 2005/0054289 A1 | * | 3/2005 | Salazar et al. ............... | 455/39 |
| 2007/0080096 A1 | | 4/2007 | Miyajima et al. | |

FOREIGN PATENT DOCUMENTS

| | | |
|---|---|---|
| JP | 2001-274220 | 10/2001 |
| JP | 2004-527899 | 9/2004 |
| JP | 2004-356478 | 12/2004 |
| JP | 2005-513459 | 5/2005 |
| WO | WO 02/056344 A2 | 7/2002 |
| WO | WO 02/056344 A3 | 7/2002 |
| WO | WO 03/053791 A3 | 7/2003 |

* cited by examiner

*Primary Examiner* — Michael D Masinick
(74) *Attorney, Agent, or Firm* — Oblon, Spivak, McClelland, Maier & Neustadt, L.L.P.

(57) ABSTRACT

A closed container in which a reticle etc. is stored and kept is provided with a pressure sensor, transmission means for transmitting data on the pressure, a controller that controls the operation of them, and a battery serving as a power source of the above elements. The controller has a sleep mode in which it causes the transmission means to transmit the data on the pressure at regular intervals and an active mode in which it causes the transmission means to transmit the data on the pressure when necessary in response to an externally supplied command. By the above described configuration, the pressure in the interior of the container can be checked appropriately.

7 Claims, 3 Drawing Sheets

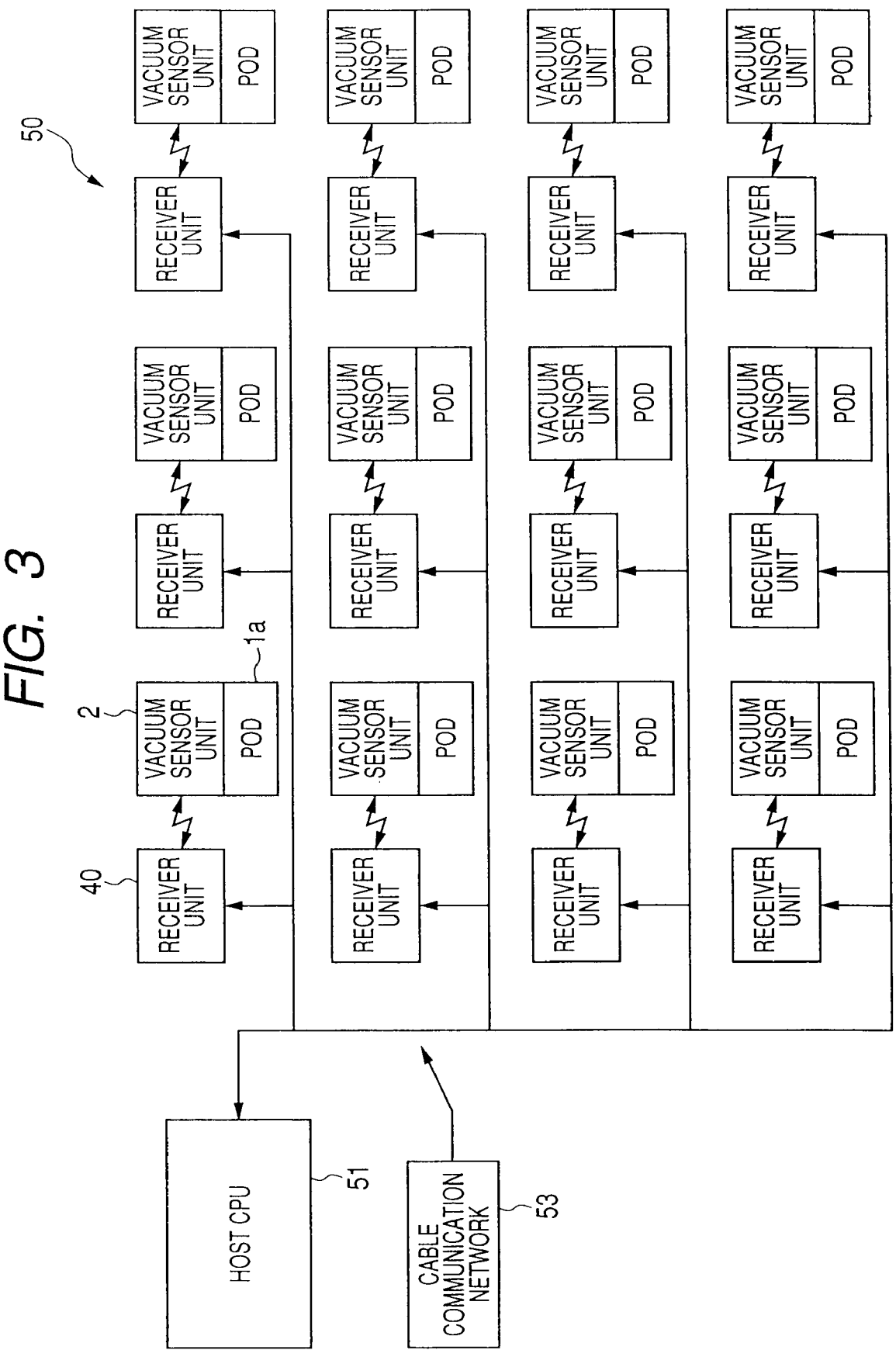

CLOSED CONTAINER AND CONTROL SYSTEM FOR CLOSED CONTAINER

This application claims priority from Japanese Patent Application No. 2008-039623 filed on Feb. 21, 2008, which is hereby incorporated by reference herein.

BACKGROUND OF THE INVENTION

1. Field of the Invention

The present invention relates to a closed container for storing an article represented by what is called a photomask that is used in a semiconductor manufacturing process etc, and a management system that can manage a plurality of such closed containers at the same time. More specifically, the present invention relates to what is called a vacuum pod that can maintain more than a certain degree of reduced pressure condition in the article storage space so as to prevent contamination of an article with oxygen, water and particulates that are sometimes called particles, and a container management system that enables checking of the reduced pressure condition in the pod and facilitates maintenance of a prescribed reduced pressure condition.

2. Description of the Related Art

A semiconductor manufacturing process or a process of manufacturing a panel for use in a flat panel display, for example, includes a process of forming minute semiconductor devices etc. such as MOSs and TFTs on a wager or a glass substrate. In this process, a photomask called a reticle is used to form a minute thin film pattern made of a metal, a semiconductor, or an insulator on the substrate. The photomask is composed, for example, of a specific glass substrate and a pattern composed of a thin metal film made of chromium or the like provided on the substrate. The pattern of the thin metal film is precisely transferred by what is called an exposure apparatus onto a photosensitive resist applied on a substrate such as a wafer for making a product. Thereafter, processes including development and etching or milling etc. are performed to produce the above-mentioned minute thin film pattern.

A reticle is used in the pattern transfer process for a number of substrates, and it is required that a reticle be prepared so as to enable transfer of a desired pattern onto resist at any time. Therefore, it is necessary that absorption of oxidizing materials such as oxygen and water that can deteriorate the thin metal film on the reticle and attachment of minute particles that can change the pattern in the exposure process be prevented as much as possible. When a reticle is in use, the exposure apparatus that uses the reticle is in a space in which oxidizing gases and minute particles are controlled very carefully. However, the reticle used needs to be changed in accordance with the product to be manufactured, and it is necessary that a reticle not in use be stored in a specific container for a long time. In addition, it is also necessary that oxidizing gases and minute particles be excluded from the interior of the storage container as much as possible for the above described reason. The storage space in the interior of the container is normally kept in a reduced pressure condition called vacuum, as described in for example Japanese Patent Application Laid-open No. 2004-356478.

If a closed container that does not have its own evacuation system is left after the pressure in the interior thereof is reduced, outside air will enter the interior of the container through seal surfaces between the lid and the body of the container or through a member that constitutes the wall of the container to decrease the degree of vacuum, in ordinary cases. Such a decrease in the degree of vacuum leads to a deterioration of the reticle storage environment. In view of this, it is proper, ideally, that the degree of vacuum in the interior of the container be increased by some operation when the degree of vacuum becomes lower than a prescribed level. However, an apparatus dedicated to improvement of the degree of vacuum in the interior of the container is rarely provided in view of various factors such as the cost and the space for the apparatus. For this reason, in many cases, the container is left in the condition achieved at the time a reticle was placed in the container, and the decrease in the degree of vacuum is left without being taken care of.

When a closed container with a decreased degree of vacuum is set on a semiconductor manufacturing apparatus or the like and the operation of taking out the content article from the interior is performed, the pressure difference between the interior of the closed container and the pressure in the interior of the semiconductor manufacturing apparatus can disturb the pressure in the container and the pressure in the semiconductor manufacturing apparatus, and a problem(s) can arise in the succeeding processing, as has been reported. As a countermeasure to this, Japanese Patent Application Laid-Open No. 2001-274220 discloses a method in which when a closed container is mounted on a semiconductor manufacturing apparatus or the like, the pressure in the interior of the closed container is checked by a system of the apparatus, and the pressure in the interior of the closed container is adjusted by evacuation if necessary. However, according to this method, the pressure etc. in the interior of the closed container cannot be checked unless the container is mounted on the semiconductor manufacturing apparatus or the like. Therefore, conditions such as the pressure in a closed container that is left alone can only be estimated indirectly based on the time elapsed after closing of the container. In other words, it is difficult to appropriately monitor the internal pressure etc. of the closed container in which a content object is stored.

SUMMARY OF THE INVENTION

The present invention has been made in view of the above described situations and has as an object to provide a closed container that enables checking of the environmental condition such as the pressure in the interior thereof and to provide a closed container management system that can manage a plurality of such closed containers at the same time.

To achieve the above object, according to the present invention, there is provided a closed container for storing an object to be stored that is managed in a clean environment, comprising a main body having an interior space in which the content object can be stored and an opening that allows communication between the interior space and an external space, a lid that can close the opening, an environmental parameter measuring apparatus that can measure at least one parameter indicative of a condition of the environment in the interior space, transmission means for transmitting data representing a measurement result obtained by the environmental parameter measuring apparatus, a controller that controls operation of the environmental parameter measuring apparatus and the transmission means, and a battery serving as a power source for the environmental parameter measuring apparatus, the transmission means, and the controller, wherein the controller has a sleep mode in which it causes the transmission means to operate at regular intervals to transmit the data and an active mode in which it causes the transmission means to transmit the data in response to an externally supplied command.

In the above described closed container it is preferred that the transmission means performs data transmission using a ray.

To achieve the above object, according to another aspect of the present invention, there is provided a management system for closed container that manages the environment in the interior space of a closed container having the above described configuration, the system comprising the closed container that further includes receiver means that receives a command signal to transfer the externally supplied command to the controller, and a receiver unit that includes receiver unit receiving means for receiving the data transmitted from the transmission means, receiver unit transmitting means for transmitting the command signal to the receiver means, and a cable communication module that transmits the received data to outside.

According to the present invention, the pressures inside closed containers under storage can be managed or controlled, and, for example, evacuation of the interior spaces of the containers can be performed to keep a prescribed internal pressure condition. In addition, the conditions of a plurality of closed containers can be monitored simultaneously. Thus, even when the internal pressures in the containers change differently from each other, appropriate treatment can be applied to each of the containers in accordance with the condition of each container. In addition, since the conditions or states of the respective individual containers can be known, pressure adjustment operations can be performed on the plurality of containers efficiently in accordance with changes in the internal pressures of the respective containers.

The above and other objects, features, and advantages of the invention will become more apparent from the following detailed description taken in conjunction with the accompanying drawings.

BRIEF DESCRIPTION OF THE DRAWINGS

FIG. 3 is a block diagram schematically showing the configuration of a container management system according to an embodiment of the present invention.

DESCRIPTION OF THE EMBODIMENTS

Figure 1:
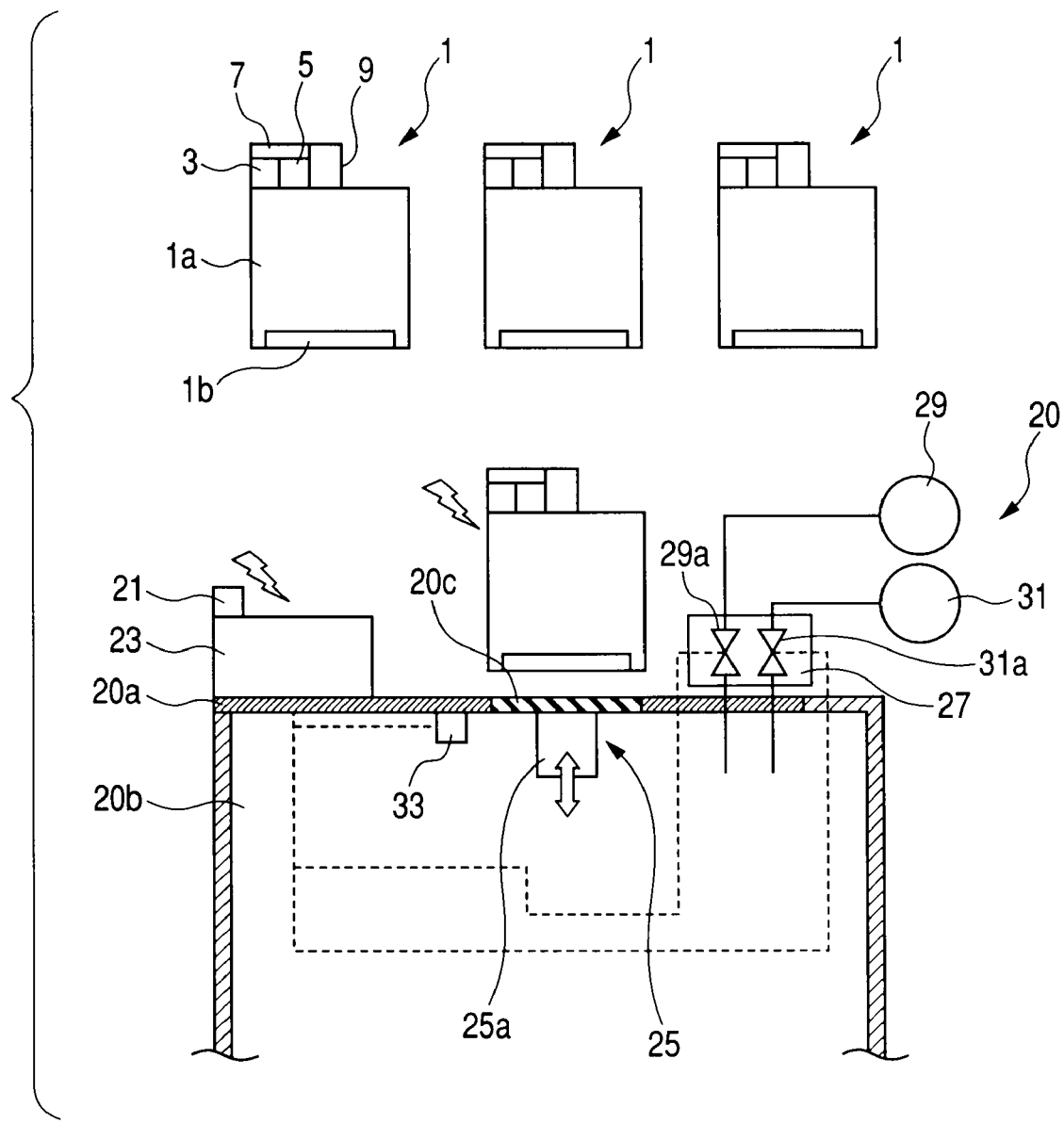
FIG. 1 is a diagram schematically showing a pod or a closed container according to an embodiment of the present invention and a portion of a load port adapted to take out a content object or reticle from the pod.
Figure 2:
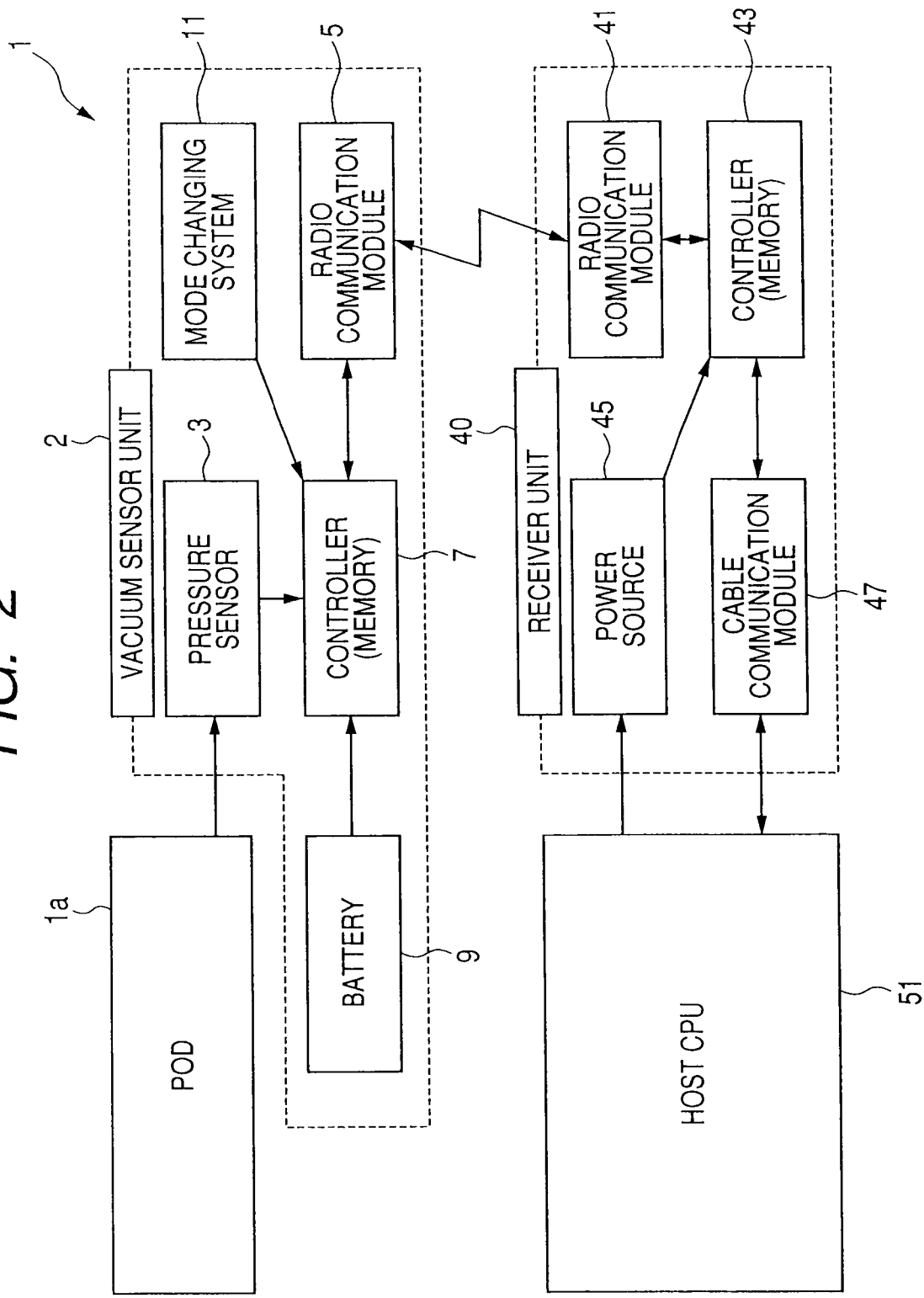
FIG. 2 a block diagram schematically showing the configuration of a pod according to the embodiment of the present invention and a receiver unit that receives a signal from the pod.

In the following, an embodiment of the present invention will be described with reference to the accompanying drawings. FIG. 1 schematically shows a pod or a closed container according to an embodiment of the present invention and a portion of what is called a load port or a lid opening and closing apparatus adapted to open/close the lid of the closed container and to bring a content such as a reticle into/out of the interior of the closed container. FIG. 2 is a block diagram showing the configuration associated with the pod and the configuration of the host control apparatus used in conjunction with the pod. The pod 1 according to the present invention has a main body 1a and a vacuum sensor unit 2. The vacuum sensor unit 2 includes a pressure sensor 3, a radio communication module 5, a controller 7, a battery 9, and a mode changing system 11. The main body 1a has an interior space in which a content object such as a reticle can be stored and an opening that leads to the interior space. The opening can be closed by a lid 1b. The controller 7 controls the operations of the pressure sensor 3, the radio communication module 5 and the battery 9 etc. and transforms signals obtained by them. The pressure sensor 3 measures the pressure in the interior space of the pod body 1a continuously or according to a command from the controller 7 in accordance with the pressure detection scheme of the pressure sensor. The radio communication module 5 transmits a signal indicative of the result of measurement by the pressure sensor 3 to a radio communication module 41 in a receiver unit that will be described later or to a radio communication module 21 in the load port. The signal has been transformed by the controller 7 into a signal complying with the mode of communication.

The controller 7 has two operation modes, namely the sleep mode and the active mode. The mode changing system 11 actually gives instructions to the controller 7 as to in which operation mode the controller is to operate. In the sleep mode, the pressure sensor 3 is configured to operate spontaneously at regular intervals set by the controller 7 in advance, and data on the pressure is transmitted by means of the radio communication module 5 to the radio communication module 41 in the receiver unit or the radio communication module 21 in the load port. The aforementioned interval is designed to be a relatively long period of time so that the battery can have a life long enough to allow measurement of the pressure in the interior of the closed container over a long period of time even if the container is left alone for a long time. However, the operation of taking the reticle out of the pod may be performed without paying attention to the timing of measurement executed at the aforementioned long intervals. In most cases, what actually matters at the time when a reticle is taken out of the pod is the internal pressure of the pod 1 at the time at which the reticle is taken out or changes in the internal pressure during a period just before the time at which the reticle is taken out. The active mode is prepared in view of this. In the active mode, the pressure sensor 3 is caused to operate in response to a certain instruction from the outside (e.g. an operation command signal received from the radio communication module 41 in the receiver unit or the radio communication module 21 in the load port), and the pressure data thus obtained is transmitted by means of the radio communication module 5 to the radio communication module 41 in the receiver unit or the radio communication module 21 in the load port. The mode changing system 11 operates upon reception of a changing command signal from the radio communication module 41 in the receiver unit or the radio communication module 21 in the load port, or in response to operation of a changing switch (not shown) annexed to the system. Thus, pressure measurement etc. in the active mode will be executed when the pod recognizes, by any means, the situation in which the operation of taking out the reticle from the pod 1 is about to be executed.

According to the present invention, by equipping each pod with an individual vacuum sensor unit 2 each having a dedicated battery 9, the pod 1 can be left alone for a long time without connection with a separate power supply system. In addition, by selecting the mode appropriately, the operation of the vacuum sensor unit 2 can be minimized during the reticle storage period other than the reticle transfer period in which the conditions such as the pressure in the pod 1 is to be detected immediately, the reticle storage period being much longer than the time taken by the pressure checking upon reticle transfer. Thus, the operation time of the pressure sensor 3 and the radio communication module 5 can be made shorter, and consumption of the battery 9 can be minimized accordingly. Consequently, the life of the battery 9 can be greatly increased, or the size of the battery 9 can be made smaller. The controller 7 may be provided with a memory. In this case, results of a certain number of times of pressure measurement by the pressure sensor 3 can be stored in the memory, and the stored results may be transmitted at the same when the results of a certain number of measurement results have been stored. This enables a further elongation the interval of the operations of the radio communication module 5 and a reduction of the operation time. The controller 7 may further be provided with comparator means for comparing a pressure measurement result and general data on pressure increase with lapse of time stored in the memory and alarm means for giving an alarm or the like, when necessary, in response to the result of the comparison. These means enable a service person to know the reticle keeping condition to some extent only by checking it with eyes.

As shown in FIG. 2, the receiver unit 40 of the host control apparatus has the receiver unit radio communication module 41, a receiver unit radio communication controller 43, a receiver unit individual power source 45, and a cable communication module 47. The receiver unit radio communication module 41 transfers a signal from the radio communication module 5 of the pod 1 obtained by the receiver unit controller 43 to the cable communication module 47. Simultaneously, the radio communication module 41 transmits, for example, a signal concerning switching of the operation mode of the pressure sensor obtained from the cable communication module 47, to the radio communication module 5 of the pod 1. The receiver unit controller 43 that controls this operation operates with power supply from the receiver unit individual power source 45 provided in the individual receiving unit 40. The cable communication module 47 is connected with a control system host control apparatus via a cable communication network that will be described later. In this embodiment, the signal communication between the radio communication modules is performed by an optical communication system using, as signal communication medium, rays represented by infrared rays. In ordinary cases, pods are frequently kept in environments in which there is/are an apparatus(es) to which a high operation voltage is applied and that can generate significant electromagnetic noise. Use of an optical signal communication system like in the present invention can prevent the system from being affected by electromagnetic noise. Even in a case where a very large number of pods are managed at the same time, communication errors can be prevented from occurring by appropriately disposing the pods and the respective corresponding receiver units.

FIG. 3 is a block diagram of the host control system 50 constructed including pods according to the present invention. Each pod 1 includes a pod main body 1*a* and a vacuum sensor unit 2. The pods 1 have respective corresponding receiver units 40. All of the receiver units 40 are connected to the host control apparatus 51 via a cable communication network 53. As described before, the pods are frequently kept in environments in which there is/are an apparatus(es) to which a high operation voltage is applied and that can generate significant electromagnetic noise. The host control apparatus 5 and the receiver units 40 may be connected by a cable communication network 53 having an appropriate shield for noise rejection. This minimizes the influence of electromagnetic noise and enables easy and simple connection of the receiver units 40 and the host control apparatus 5. In addition, a so-called multiplexer or the like may be used in the host control apparatus 5. By using the multiplexer, it is possible to remove restrictions imposed by the radio wave control law or the like that should be taken into account when signal communication using a plurality of frequencies is adopted, and a plurality of pods can be managed at the same time. Thus, the combined use of the above described radio communication and the cable communication advantageously facilitates a reduction of the influence of electromagnetic noise and enables simultaneous control of a number of pods.

The use of the individual power source in each receiver unit enables a reduction of the possibility that the power source is affected by the above described electromagnetic noise. Furthermore, the equipment annexed to the controller 7 in the above described vacuum sensor unit 2 may be annexed to the receiver unit controller 43 provided in the receiver unit 40, and various operations performed by the controller 7 may be performed by the controller 43. In this case, the configuration of the pod can be made simpler, and battery consumption can be reduced. Furthermore, in this case, the configuration of the pod may be the same as that described above, and the controller 43 may be configured to extract specific data such as, for example, data on an alarm to be given and data obtained at a specific cycle and to transmit only the extracted data to the host control apparatus. This facilitates the unified control by the host control apparatus 51. The receiver unit 40 may be configured to operate only when power is supplied to the individual power source 45 for the receiver unit from the host control apparatus 51. In this case, it is preferred that the power source 45 be equipped with means for stabilizing the supply voltage, since there is a possibility that the power source 45 is affected by noise etc. By adopting the above described configuration, power consumption in the entire control system can be advantageously reduced.

In the following, a description will be made of a load port 20 to which the pod 1 according to the present invention is to be loaded and that is adapted to bring the reticle into/out of the pod 1. Here, "loading" of the pod 1 refers to the operation of placing the pod at a prescribed position on the load port so that the pod is fixed thereon in such a way as to allow transportation of the reticle into/out of the pod. As shown in FIG. 1, the load port 20 has a small space 20*b* separated from the external space by an outer wall 20*a*, a load port controller 23, an pressure control system 27, a door 25 that closes an opening 20*c* provided on the outer wall 20*a*, and a mechanism 25*a* for driving the door 25. The pressure control system 27 is connected with an air supply system 29 via an air supply valve 29*a* and an exhaust system 31 via an exhaust valve 31*a* to control the pressure in the small space 20*b*. In the small space 20*b* is provided a load port pressure sensor 33 that measures the pressure in the small space 20*b* that is controlled by the pressure control system 27. The load port controller 23 performs signal communication with the load port pressure sensor 33, the pressure control system 27, and the door drive mechanism 25*a* to control the operations of them. The door 25 is adapted to close the opening 20*c* leading to the small space 20*b*. In addition, the door 25 is adapted to hold the lid 1*b* of the pod 1 when it opens the opening 20*c* to thereby bring the interior space of the pod 1 and the small space into communication with each other. The load port controller 23 has a load port radio communication module 21, which transmits signals related to various commands from the controller 23 to the pod 1 and receives signals related to pressure information from the pod 1.

In the case of a system for handling reticles, a high degree of vacuum is generally established in the small space 20*b*. On the other hand, the degree of vacuum in the interior of the pod 1 tends to be degraded due to, for example, leakage etc, and in many cases it is lower than the high degree of vacuum in the small space 20*b* (though the pressure in the interior of the pod 1 is not as high as the atmospheric pressure). In the closed space defined between the pod 1 and the door 25c is enclosed air, which is once evacuated from this space to establish a certain degree of vacuum when the lid 1b is opened. Thus, when the lid 1b of the pod 1 is opened, three spaces or the interior space of the pod 1, the space defined between the lid 1b of the pod and the door 25c, and the small space 20b that are in different pressure conditions are brought into communication. However, at the time of loading the pod 1 to the load port 20, the pressure in the small space 20b is ordinarily adjusted by the pressure control system 27 so as to be made equal to the pressure (absolute pressure) in the interior space of the pod 1, and the operation of opening/closing the lid 1b of the pod by the door 25 and opening the opening 20c is performed in this state. Therefore, in conventional systems, it is not possible to recognize or check how the condition of the environment in which the reticle is kept (e.g. the pressure in the interior of the pod 1) is or has been. In contrast to this, according to the present invention, it is possible to open the pod 1 after checking the present or past condition of the environment in which the reticle is and has been kept, even in a case in which the pod has been left for a long time with the reticle being contained therein. Specifically, for example, when the operation of detaching the lid 1b is to be performed, the pressure inside the pod 1 and the pressure in the small space 20b can be made substantially equal to each other before opening the lid. This provides advantages such as a reduction in the time taken by the lid opening operation. In a case where the pod keeping conditions have been greatly deteriorated, it may sometimes be necessary to perform some processing on the reticle before it is directly loaded to the load port 20. According to the present invention, such a situation can be detected at the time of loading, and it is possible to prevent a trouble that an inappropriate pod is directly loaded.

In conventional systems, the operation of decreasing the pressure (absolute pressure) in the interior space of the pod 1 by evacuation is performed only at the time of transferring the reticle into the pod 1 and unloading (i.e. the operation reverse to the aforementioned "loading") the pod 1 with the reticle being stored therein. In this operation, the pressure in the small space 20b is adjusted by the pressure control system 27 in a state in which the small space 20b and the interior space of the pod 1 are in communication with each other, and thereafter the pod 1 is closed by the lid 1b. In ordinary cases, the operation of opening/closing the lid 1b is performed only at the time when the reticle stored in the pod 1 is used. This operation is performed according to a program that has been determined in advance based on a sequence of executing transfer of the reticle into/out of the pod. In contrast to this, according to the present invention, it is possible to actually detect a state in which the pressure in the interior of the pod 1 has become higher than a certain pressure value and it is difficult to keep the reticle appropriately unless the pressure is decreased. Thus, evacuation of the interior space of the pod 1 can be performed when necessary. In conventional systems, no consideration has needed to be given to a case of performing only the aforementioned evacuation of the interior space of the pod 1. In the system according to the present invention, it is considered to be appropriate that means dedicated only to the evacuation operation be provided, or a certain program specialized for this purpose be provided and the evacuation operation be performed according to this program.

It is preferred that the process of loading the pod 1 having the above described structure to the load port 20 and taking out the reticle stored in the pod 1 by a transportation robot (not shown) or the like provided in the load port 20 be performed according to the following sequence. When the lid 1b of the pod 1 and the door of the load port 20 are brought into contact with each other to detach the lid 1b, a signal indicative of execution of the detaching operation is sent to the controller 7, and the mode changing system 11 brings the pressure sensor 3 into a state for performing an operation in the active mode. Thereafter, the pressure in the interior of the pod 1 is measured, and a signal indicative of the pressure is transmitted to the load port controller 23 via the radio communication module 5 and the load port radio communication module 21. The load port controller 23 causes the pressure control system 27 to operate to make the pressure in the small space 20b measured by the load port pressure sensor 33 substantially equal to the pressure in the interior of the pod 1. After the pressure in the small space 20b has been made substantially equal to the pressure in the interior of the pod 1, the operation of opening and closing the lid 1b of the pod 1 and opening the opening 20c are performed by the door 25. Thus, there is no substantial difference between the pressure in the interior of the pod 1 and the pressure in the small space 20b at the time when the lid 1b is opened, and the load on the door drive mechanism 25a can be reduced accordingly. Therefore, the door drive mechanism can be made simpler. Furthermore, thanks to the decrease in the pressure difference, occurrence of air flow between these spaces upon opening the lid is prevented, and deterioration of the environment due to scattering of minute particles caused by occurrence of such air flow can be reduced.

Although in the above described embodiment the object stored in the closed container is exemplified by a reticle, the closed container to which the present invention is applied is not limited to this. The closed container according to the present invention may be any closed container that is used to store an object or article that is to be kept in a so-called clean environment. The examples of the stored object include a silicon wafer for semiconductor devices, a glass substrate for an LCD panel, and a substrate for an optical disk. Although the measurement parameter used in the above-described embodiment is the pressure inside the pod, the parameter used in the present invention is not limited to this. The parameter used in the present invention may be any parameter that should be paid attention to when the above described articles are controlled. The examples of the parameter include the oxygen partial pressure, humidity, and partial pressure of a specific gas. Therefore, in the present invention, it is desirable that the pressure sensor in the above described embodiment be considered as an example of an environmental parameter measuring apparatus that measures at least one of the various parameters, such as the pressure and the oxygen partial pressure etc, that determine the environment in the interior space of the closed container. Although in the above described embodiment the communication means is exemplified by the radio communication module provided in the pod and the radio communication module provided in the receiver unit, any mode of communication means may be adopted as long as it includes at least transmission means for transmitting data on, for example, the pressure in the interior of the pod, and as long as the transmission mode in the data transmission by the transmission means can be controlled by a controller. In this connection, it is preferred that means for receiving a signal be additionally provided in the communication means if needed. In the above described embodiment, there are two modes of measurement and communication, which are switched over by a system in the pod. Therefore, the host control apparatus is required only to collectively process obtained data on changes in the environment. Thus, the load on the host control apparatus can be made low. However, the number of modes may be increased. The mode changing may be commanded by the host control apparatus to lighten the load on the system in the pod.

By using the above described pod or closed container according to the present invention and the management system that can control a plurality of such pods at the same time, the condition of pods under storage can be managed at the same time, and proper process can be performed appropriately according to the condition of the pods.

As many apparently widely different embodiments of the present invention can be made without departing from the spirit and scope thereof, it is to be understood that the invention is not limited to the specific embodiments thereof except as defined in the appended claims.

What is claimed is:

1. A closed container for storing an object to be stored that is managed in a clean environment, comprising:
   a main body having an interior space in which said object can be stored and an opening that allows communication between said interior space and an external space;
   a lid that can close said opening;
   an environmental parameter measuring apparatus that can measure at least one parameter indicative of a condition of the environment in said interior space;
   transmission means for transmitting data representing a measurement result obtained by said environmental parameter measuring apparatus;
   a controller that controls operation of said environmental parameter measuring apparatus and said transmission means;
   a battery serving as a power source for said environmental parameter measuring apparatus, said transmission means, and said controller;
   a mode changing system which is separate from said controller and controls operating modes of said controller; and
   a radio communication module provided on said closed container and configured to receive an operation command signal which is externally supplied and transmitted to said controller, and to receive a mode changing command signal which is externally supplied and transmitted to said mode changing system, wherein
   said controller has a sleep mode, as one of said operating modes, in which said controller causes said environmental parameter measuring apparatus to operate and said transmission means to operate at regular intervals to transmit said data and an active mode, as another one of said operating modes, in which said controller causes said environmental parameter measuring apparatus to operate in response to said operation command signal, and causes said transmission means to transmit said data, and
   said radio communication module provides said mode changing command signal to said mode changing system, which causes said mode changing system to control said controller, based on said mode changing command signal, to execute one of said sleep mode and said active mode by providing a corresponding instruction to said controller.

2. A closed container according to claim 1, wherein said transmission means performs data transmission using a ray.

3. A management system for a closed container that manages the environment in an interior space of said closed container, comprising:
   a closed container for storing an object to be stored that is managed in a clean environment including:
      a main body having said interior space in which said object can be stored and an opening that allows communication between said interior space and an external space,
      a lid that can close said opening,
      an environmental parameter measuring apparatus that can measure at least one parameter indicative of a condition of the environment in said interior space,
      transmission means for transmitting data representing a measurement result obtained by said environmental parameter measuring apparatus,
      a controller that controls operation of said environmental parameter measuring apparatus and said transmission means,
      a battery serving as a power source for said environmental parameter measuring apparatus, said transmission means, and said controller,
      a mode changing system which is separate from said controller and controls operating modes of said controller, and
      a radio communication module provided on said closed container and configured to receive an operation command signal which is externally supplied and transmitted to said controller, and to receive a mode changing command signal which is externally supplied and transmitted to said mode changing system, wherein
      said controller has a sleep mode, as one of said operating modes, in which said controller causes said environmental parameter measuring apparatus to operate and said transmission means to operate at regular intervals to transmit said data and an active mode, as another one of said operating modes, in which said controller causes said environmental parameter measuring apparatus to operate in response to said operation command signal, and causes said transmission means to transmit said data, and
      said radio communication module provides said mode changing command signal to said mode changing system, which causes said mode changing system to control said controller, based on said mode changing command signal, to execute one of said sleep mode and said active mode by providing a corresponding instruction to said controller; and
   a receiver unit that includes receiver unit receiving means for receiving said data transmitted from said transmission means, receiver unit transmitting means for transmitting said mode changing command signal and said operation command signal to said radio communication module, and a cable communication module that transmits said received data to outside.

4. A closed container for storing an object to be stored that is managed in a low-pressure and clean environment, comprising:
   a main body having an interior space in which said object can be stored and an opening that allows communication between said interior space and an external space;
   a lid that can close said opening;
   an environmental parameter measuring apparatus that can measure at least one parameter indicative of a condition of the environment in said interior space;
   transmission means for transmitting data representing a measurement result obtained by said environmental parameter measuring apparatus;
   a controller that controls operation of said environmental parameter measuring apparatus and said transmission means;

a battery serving as a power source for said environmental parameter measuring apparatus, said transmission means, and said controller;

a mode changing system which is separate from said controller and controls operating modes of said controller; and a radio communication module provided on said closed container and configured to receive an operation command signal which is externally supplied and transmitted to said controller, wherein said controller has a sleep mode, as one of said operating modes, in which said controller causes said environmental parameter measuring apparatus and said transmission means to operate at regular intervals to transmit said data and an active mode, as another one of said operating modes, in which said controller causes said environmental parameter measuring apparatus to operate in response to said operation command signal, and causes said transmission means to transmit said data, and in response to an operation of a mode changing switch, said mode changing system controls said controller to execute one of said sleep mode and said active mode by providing a corresponding instruction to said controller.

5. A closed container according to claim 4, wherein said transmission means performs data transmission using a ray.

6. A closed container according to claim 1, wherein said controller relays said mode changing command signal from said radio communication module to said mode changing system.

7. A closed container according to claim 1, wherein said at least one parameter indicative of said condition of the environment in said interior space is a pressure.

* * * * *